United States Patent
Shirai et al.

(10) Patent No.: US 10,905,138 B2
(45) Date of Patent: Feb. 2, 2021

(54) EFFERVESCENT BEVERAGE AND METHOD PERTAINING TO SAME

(71) Applicant: SAPPORO HOLDINGS LIMITED, Shibuya-ku (JP)

(72) Inventors: Masanori Shirai, Shibuya-ku (JP); Hidekazu Narita, Shibuya-ku (JP); Norikatsu Sawai, Shibuya-ku (JP); Koji Yanagawa, Shibuya-ku (JP)

(73) Assignee: Sapporo Breweries Limited, Tokyo (JP)

( * ) Notice: Subject to any disclaimer, the term of this patent is extended or adjusted under 35 U.S.C. 154(b) by 123 days.

(21) Appl. No.: 15/541,756

(22) PCT Filed: Feb. 18, 2016

(86) PCT No.: PCT/JP2016/054757
§ 371 (c)(1),
(2) Date: Jul. 6, 2017

(87) PCT Pub. No.: WO2016/133173
PCT Pub. Date: Aug. 25, 2016

(65) Prior Publication Data
US 2018/0000132 A1    Jan. 4, 2018

(30) Foreign Application Priority Data
Feb. 20, 2015    (JP) .................. 2015-031783

(51) Int. Cl.
*A23L 2/52*    (2006.01)
*C12C 5/02*    (2006.01)
(Continued)

(52) U.S. Cl.
CPC .................. *A23L 2/52* (2013.01);
*A23L 2/40* (2013.01); *C12C 5/02* (2013.01); *C12C 11/11* (2013.01);
(Continued)

(58) Field of Classification Search
CPC ..... A23L 2/52; A23L 2/40; C12C 5/02; C12C 11/11
(Continued)

(56) References Cited

U.S. PATENT DOCUMENTS 4,832,968 A    5/1989  Forage et al.
5,853,782 A    12/1998 Larsson
(Continued)

FOREIGN PATENT DOCUMENTS

JP    62-135156 A    6/1987
JP    2013-13385 A   1/2013
(Continued)

OTHER PUBLICATIONS

Miyachi H., Beer Jozo Gijutsu Shokuhin Sangyo Shimbunsha Co., Ltd., Dec. 28, 1999, pp. 351, 379-401 (see partial translation of Japanese Office Action).
(Continued)

*Primary Examiner* — Helen F Heggestad
(74) *Attorney, Agent, or Firm* — Morgan, Lewis & Hockins LLP

(57) ABSTRACT

Provided are a sparkling beverage having excellent foam properties and a method for the same. A sparkling beverage according to one embodiment of the present invention has a ratio of a nitrogen content (ppm) to an extract (w/v %) of less than 28.0. A method of improving foam properties of a sparkling beverage according to one embodiment of the present invention includes adjusting a ratio of a nitrogen content (ppm) to an extract (w/v %) of a sparkling beverage to less than 28.0, to thereby improve foam properties of the sparkling beverage.

11 Claims, 2 Drawing Sheets

(51) Int. Cl.
  *A23L 2/40* (2006.01)
  *C12C 11/11* (2019.01)
  *C12G 3/022* (2019.01)
  *C12G 3/023* (2019.01)

(52) U.S. Cl.
  CPC .............. *C12G 3/022* (2019.02); *C12G 3/023* (2019.02); *A23V 2002/00* (2013.01)

(58) Field of Classification Search
  USPC .................. 426/590, 592, 600, 564, 477
  See application file for complete search history.

(56) References Cited

U.S. PATENT DOCUMENTS

| | | | |
|---|---|---|---|
| 6,247,614 | B1* | 6/2001 | Whitney et al. |
| 9,420,822 | B2* | 8/2016 | Yanagawa et al. |
| 2005/0106306 | A1* | 5/2005 | Mennett et al. |
| 2007/0178189 | A1 | 8/2007 | Ishii et al. |
| 2012/0282370 | A1 | 11/2012 | Kimura et al. |
| 2014/0255545 | A1 | 9/2014 | Kozaki et al. |

FOREIGN PATENT DOCUMENTS

| | | |
|---|---|---|
| JP | WO2013/061891 A1 | 5/2013 |
| KR | 10-2006-0063878 A | 6/2006 |
| WO | WO 2011/052483 A1 | 5/2011 |

OTHER PUBLICATIONS

Pierce, JS., Ferment, 1991, vol. 4, No. 2.

Office Action issued in corresponding Japanese Patent Application No. 2015-031783 dated Mar. 19, 2019 (see partial English translation).

International Search Report dated May 24, 2016 in PCT/JP2016/054757 filed Feb. 18, 2016.

A. J. L. Kennedy, "The Use of Nitrogen in the Brewing Industry", Ferment, vol. 7, No. 1, Feb. 1994, 9 Pages.

Gregory C. Kreder, "Nitrogen Analysis in Beer Using a Zahm Custom Sample Bottle", Journal of the American Society of Brewing Chemists, vol. 61, No. 2, 2003, 5 Pages.

L. Narziß, et al., "Use of lactic acid malt in the brewing process. Part II: Use of various concentrations of lactic acid malt with brewing waters of different hardness", Brauwelt, vol. 112, No. 18, 1972, 7 Pages.

Shusaku Kashiwada, "Quality of Beer", Journal of the Brewing Society of Japan, vol. 96, No. 5, 2001, 10 Pages.

Office Action dated Oct. 22, 2018 in Korean Patent Application No. 10-2017-7018480, 6 pages.

Durian, D. J. et al., "Making a frothy shampoo or beer", Physics Today, 2010, pp. 62-63.

Kennedy A. J. L., The Use of Nitrogen in the Brewing Industry., Ferment, 1994, vol. 7, No. 1, p. 43-50, ISSN:0957-7041.

* cited by examiner

EFFERVESCENT BEVERAGE AND METHOD PERTAINING TO SAME

TECHNICAL FIELD

The present invention relates to a sparkling beverage and a method relating to the same.

BACKGROUND ART

Hitherto, for example, Patent Literature 1 discloses that by press fitting a hollow body (so-called widget) having nitrogen gas filled at atmospheric pressure or at a pressure higher than atmospheric pressure in advance into a can of a sparkling beverage, such as beer, preferred foam of the sparkling beverage is obtained.

CITATION LIST

Patent Literature

[Patent Literature 1] JP S62-135156 A

SUMMARY OF INVENTION

Technical Problem

However, it has not been easy to accomplish excellent foam properties without using a special gas-holding device, such as the widget or a special dispensing device, such as a server.

The present invention has been made in view of the problem described above, and one of the objects of the present invention is to provide a sparkling beverage having excellent foam properties and a method relating to the same.

Solution to Problem

A sparkling beverage according to one embodiment of the present invention for solving the problem described above has a ratio of a nitrogen content (ppm) to an extract (w/v %) of less than 28.0. According to the one embodiment of the present invention, the sparkling beverage having excellent foam properties is provided.

In addition, the extract may be 1.20 w/v % or more. In addition, the nitrogen content may be 20 ppm or more. In addition, the sparkling beverage may have a NIBEM value of 240 seconds or more. In addition, the sparkling beverage may be held in a container having a volume of 1 L or less.

A method of producing a sparkling beverage according to one embodiment of the present invention for solving the problem described above includes producing a sparkling beverage having a ratio of a nitrogen content (ppm) to an extract (w/v %) of less than 28.0. According to the one embodiment of the present invention, a method of producing a sparkling beverage having excellent foam properties is provided.

A method according to one embodiment of the present invention for solving the problem described above includes adjusting a ratio of a nitrogen content (ppm) to an extract (w/v %) of a sparkling beverage to less than 28.0, to thereby improve foam properties of the sparkling beverage. According to the one embodiment of the present invention, a method of effectively improving the foam properties of the sparkling beverage is provided.

Advantageous Effects of Invention

According to the present invention, a sparkling beverage having excellent foam properties and a method for the same are provided.

DESCRIPTION OF EMBODIMENTS

Figure 1A:
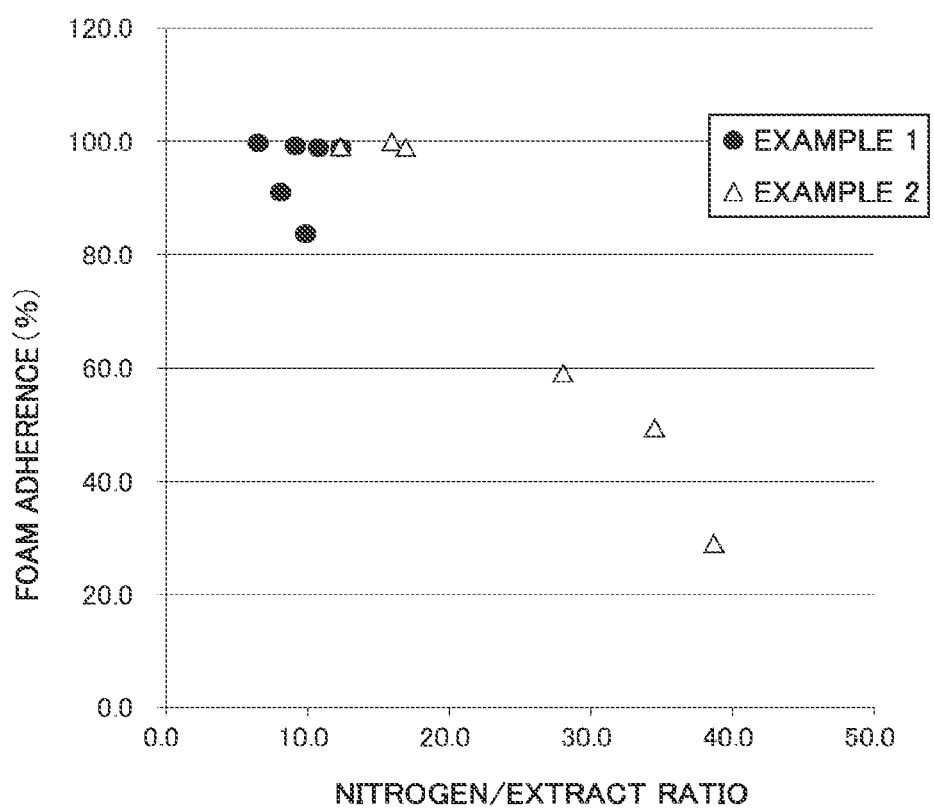
FIG. 1A is an explanatory diagram for showing examples of evaluation results for a relationship between a ratio of a nitrogen content (ppm) to an extract (w/v %) of a sparkling beverage and foam adherence of the sparkling beverage in Examples according to one embodiment of the present invention.

Now, one of the embodiments of the present invention will be described. The present invention is not limited to the embodiment.

A sparkling beverage according to the embodiment of the present invention has a ratio of a nitrogen content (ppm) to an extract (w/v %) of less than 28.0. A method of producing a sparkling beverage according to the embodiment of the present invention is a method including producing a sparkling beverage having a ratio of a nitrogen content (ppm) to an extract (w/v %) of less than 28.0. A method of improving foam properties of a sparkling beverage according to the embodiment of the present invention is a method including adjusting a ratio of a nitrogen content (ppm) to an extract (w/v %) of the sparkling beverage to less than 28.0, to thereby improve the foam properties of the sparkling beverage.

In the embodiment, the sparkling beverage has excellent foam properties by virtue of having a ratio of a nitrogen content (ppm) to an extract (w/v %) (hereinafter referred to as "nitrogen/extract ratio") of the sparkling beverage that is less than 28.0.

That is, the inventors of the present invention have made extensive investigations with regard to technical means for improving foam properties of a sparkling beverage, in view of a problem in that when a nitrogen content of a sparkling beverage is merely adjusted, the foam properties of the sparkling beverage cannot be sufficiently improved in some cases. As a result, the inventors have surprisingly obtained a unique finding that the foam properties of the sparkling beverage are effectively improved by adjusting the ratio of the nitrogen content to the extract (nitrogen/extract ratio) of the sparkling beverage to a specific range. Thus, the inventors have completed the present invention.

The nitrogen/extract ratio of the sparkling beverage is not particularly limited as long as the nitrogen/extract ratio is less than 28.0. However, the nitrogen/extract ratio may be, for example, preferably 25.0 or less, more preferably 23.0 or less, particularly preferably 20.0 or less. While the lower limit value of the nitrogen/extract ratio is not particularly limited as long as the nitrogen/extract ratio falls within a range where the effect provided by the present invention is obtained, the nitrogen/extract ratio may be, for example, 3.0 or more, or 5.0 or more.

The extract of the sparkling beverage is not particularly limited as long as the nitrogen/extract ratio falls within the above-mentioned specific range. However, the extract may be, for example, 1.20 w/v % or more. In addition, the extract of the sparkling beverage may be, for example, preferably 1.50 w/v % or more, more preferably 2.00 w/v % or more, particularly preferably 2.50 w/v % or more. Furthermore, the extract of the sparkling beverage may be, for example, 10.0 w/v % or less.

The extract (w/v %) of the sparkling beverage is measured as described below. That is, when the ethanol content of the sparkling beverage is 0.5 vol % or more and the extract of the sparkling beverage is 10.0 w/v % or less, the extract (sometimes called a real extract) (w/v %) of the sparkling beverage is measured in accordance with a method disclosed in the literature: "Revised BCOJ Beer Analysis Method, Enlarged and Revised Edition 2013 (edited by Brewery Convention of Japan (Analysis Committee), Brewers Association of Japan, publishing office: The Brewing Society of Japan)", "8.4 Real Extract", "8.4.3 Alcolyzer Method".

In addition, when the ethanol content of the sparkling beverage is less than 0.005 vol %, the extract (w/v %) of the sparkling beverage is measured in accordance with a method disclosed in the literature: "Revised BCOJ Beer Analysis Methods, Enlarged and Revised Edition 2013 (edited by Brewery Convention of Japan (Analysis Committee), Brewers Association of Japan, publishing office: The Brewing Society of Japan)", "7.2 Extract".

In addition, when the ethanol content of the sparkling beverage is 0.005 vol % or more and less than 0.5 vol %, the extract (w/v %) of the sparkling beverage is measured as extract content defined in Liquor Tax Act of Japan, i.e., the number of grams of nonvolatile components contained in a unit volume of 100 cubic centimeters at a temperature of 15° C.

The nitrogen content of the sparkling beverage is not particularly limited as long as the nitrogen/extract ratio falls within the above-mentioned specific range, and the nitrogen content may be, for example, 20 ppm or more. In addition, the nitrogen content of the sparkling beverage may be 25 ppm or more. Furthermore, the nitrogen content of the sparkling beverage may be 100 ppm or less.

The nitrogen content of the sparkling beverage is measured as described below. That is, as described later, the sparkling beverage is held in a container to be provided as a final sparkling beverage product. Then, the nitrogen content of the sparkling beverage is obtained by measuring a nitrogen gas pressure in an empty portion inside the container of the sparkling beverage product through use of a commercially available dissolved nitrogen/carbon dioxide gas analyzer (model 511 series, manufactured by HackUltra Co., Ltd.). The analyzer is equipped with a detector for nitrogen gas including a thermal conductivity detector (TCD) element.

More specifically, the nitrogen content (ppm) of the sparkling beverage is obtained by inserting a needle-like sampling part connected to a detector for nitrogen gas (measurement range: from 0 ppm to 350 ppm) of the analyzer into the empty portion inside the container of the sparkling beverage product, and then measuring the nitrogen gas pressure in the empty portion at 20° C.

In addition, the carbon dioxide gas pressure of the sparkling beverage is not particularly limited, and may be, for example, 1.00 kgf/cm$^2$ or more, 1.10 kgf/cm$^2$ or more, or 1.20 kgf/cm$^2$ or more. In addition, the carbon dioxide gas pressure of the sparkling beverage may be, for example, 3.00 kgf/cm$^2$ or less.

The carbon dioxide gas pressure (kgf/cm$^2$) of the sparkling beverage is measured as described below. That is, in the same manner as in the case of the nitrogen content described above, the carbon dioxide gas pressure of the sparkling beverage is obtained by measuring a carbon dioxide gas pressure in the empty portion inside the container of the sparkling beverage product using the commercially available dissolved nitrogen/carbon dioxide gas analyzer (model 511 series, manufactured by HackUltra Co., Ltd.).

More specifically, the carbon dioxide gas pressure (bar) of the sparkling beverage is obtained by inserting a needle-like sampling part connected to a detector for carbon dioxide gas (measurement range: from 0 bar to 10 bar) of the analyzer into the empty portion inside the container of the sparkling beverage product, and then measuring the carbon dioxide gas pressure in the empty portion at 20° C., and then, the carbon dioxide gas pressure (kgf/cm$^2$) of the sparkling beverage is finally obtained by converting the unit of the value (bar) measured with the detector for carbon dioxide gas into kgf/cm$^2$.

As described above, the sparkling beverage may be held in a container. That is, in this embodiment, in a sparkling beverage product which includes a sparkling beverage and a container for holding the sparkling beverage, the nitrogen/extract ratio of the sparkling beverage may fall within the above-mentioned specific range. In this case, the sparkling beverage product may not include a gas-holding device, such as a widget, in its container.

In the sparkling beverage product, the empty portion inside the container may be filled with gas which contains nitrogen gas. In this case, the empty portion inside the container may be filled with gas which contains nitrogen gas and carbon dioxide gas. The empty portion inside the container is the headspace of the container. That is, the empty portion is a space formed between the liquid surface of the sparkling beverage in the container and the inner surface of the container.

The container is not particularly limited as long as the container can hold the sparkling beverage, and for example, a can, a bottle, or a barrel may be preferably used. The size of the container is not particularly limited, and for example, the volume of the container may be 1 L or less. That is, for example, the container may be a can, a bottle, or a barrel having a volume of 1 L or less, may be a can or a bottle having a volume of 1 L or less, or may be a can or a bottle having a volume of 750 mL or less. The lower limit value of the volume of the container is not particularly limited, and the volume may be, for example, 100 mL or more.

In addition, the container may be free of a connection port to a dispensing device, such as a server. That is, the container may be a can or a bottle having a volume of 1 L or less, or 750 mL or less, and being free of a connection port to a dispensing device, such as a server.

In this embodiment, even when the volume of the container is relatively small as described above and the container does not include a gas-holding device, such as a widget, excellent foam properties of the sparkling beverage are achieved merely by directly pouring the sparkling beverage from the container into a drinking container, such as a glass, without using a special dispensing device, such as a server.

A constituent material for the container is not particularly limited, and there may be used, for example, one or more kinds selected from a group consisting of metals, inorganic materials (such as glass and ceramics), and organic materials (such as resins and paper).

That is, the container may be, for example, a can made of a metal (for example, aluminum or steel), a bottle made of glass or a bottle made of a resin (for example, a bottle made of polyethylene terephthalate (PET): PET bottle), a barrel made of a metal (for example, aluminum or steel) or a barrel made of a resin.

The sparkling beverage is a beverage having foam properties including a foam-forming property and a foam-stability. That is, the sparkling beverage is, for example, a beverage containing carbon dioxide gas and having: a foam-forming property for forming a foam layer on a top of a liquid surface when poured into a container, such as a glass; and a foam-stability for holding the formed foam for a certain period of time or longer.

The sparkling beverage may be a sparkling alcoholic beverage. The sparkling alcoholic beverage is a sparkling beverage having an ethanol content of 1 vol % or more (alcohol content of 1% or more). The ethanol content of the sparkling alcoholic beverage is not particularly limited as long as the ethanol content is 1 vol % or more, and the ethanol content may be, for example, from 1 vol % to 20 vol %.

The sparkling beverage may be a sparkling non-alcoholic beverage. The sparkling non-alcoholic beverage is a sparkling beverage having an ethanol content of less than 1 vol %. The ethanol content of the sparkling non-alcoholic beverage is not particularly limited as long as the ethanol content is less than 1 vol %, and the ethanol content may be, for example, less than 0.5 vol %, less than 0.05 vol %, or less than 0.005 vol %.

The color value of the sparkling beverage may be 50 EBC or less, preferably 30 EBC or less, more preferably 15 EBC or less. When the color value of the sparkling beverage is relatively low as just described, a color of foam formed on a liquid surface of the sparkling beverage is made uncolored white.

A method of adjusting a color value of the sparkling beverage is not particularly limited, and for example, the sparkling beverage of which color value falls within such range as described above may be preferably produced on the basis of the composition of a raw material and/or conditions under which a raw material solution is prepared (preparation conditions). The color value of the sparkling beverage is measured in accordance with a method disclosed in the literature: "Revised BCOJ Beer Analysis Method, Enlarged and Revised Edition 2013 (edited by Brewery Convention of Japan (Analysis Committee), Brewers Association of Japan, publishing office: The Brewing Society of Japan)", "8.8 color value", "8.8.2 Absorbance Method (IM)".

The improvement of foam properties of a sparkling beverage is confirmed by, for example, an increase in NIBEM value of the sparkling beverage. The NIBEM value is used as an indicator of the foam-stability of a sparkling alcoholic beverage, such as beer.

The NIBEM value is evaluated as a time (seconds) required for reducing a height of foam formed when a sparkling beverage is poured into a predetermined container by a predetermined amount. Specifically, the NIBEM value of the sparkling beverage is measured in accordance with a method disclosed in the literature: "Revised BCOJ Beer Analysis Method, Enlarged and Revised Edition 2013 (edited by Brewery Convention of Japan (Analysis Committee), Brewers Association of Japan, publishing office: The Brewing Society of Japan)", "8.29 Foam—Foam-stability Measurement Method using NIBEM-T-". A larger NIBEM value means that foam properties of the sparkling beverage are more excellent.

The NIBEM value of the sparkling beverage in which the nitrogen/extract ratio falls within the above-mentioned specific range is large compared to that of a sparkling beverage in which the nitrogen/extract ratio falls outside the specific range. The NIBEM value of the sparkling beverage in which the nitrogen/extract ratio falls within the above-mentioned specific range may be, for example, 240 seconds or more, and may be preferably 250 seconds or more, more preferably 280 seconds or more, particularly preferably 300 seconds or more.

The NIBEM value of the sparkling beverage in which the nitrogen/extract ratio falls within the above-mentioned specific range may be larger than that of the sparkling beverage in which the nitrogen/extract ratio falls outside the specific range by 10 or more, and may be preferably larger by 30 or more, more preferably larger by 50 or more.

An improvement of foam properties of the sparkling beverage may be confirmed by, for example, a degree of a foam adherence of the sparkling beverage. The foam adherence of a sparkling beverage is measured by pouring the sparkling beverage into a glass, and after disruption of foam through passage of a certain period of time, optically scanning a glass surface to which the foam has adhered, and is then evaluated as a ratio (%) of an area of a part covered with foam with respect to a total area scanned. A higher value of the foam adherence (%) means that the foam properties of the sparkling beverage are more excellent.

The foam adherence of the sparkling beverage in which the nitrogen/extract ratio falls within the above-mentioned specific range is large compared to that of a sparkling beverage in which the nitrogen/extract ratio falls outside the specific range. The foam adherence of the sparkling beverage in which the nitrogen/extract ratio falls within the above-mentioned specific range may be, for example, 60.0% or more, and may be preferably 70.0% or more, more preferably 80.0% or more.

In the method of producing a sparkling beverage according to the embodiment of the present invention, a sparkling beverage in which the nitrogen/extract ratio falls within the above-mentioned specific range is produced. The method of producing a sparkling beverage is not particularly limited as long as the method involves adjusting the nitrogen/extract ratio of the sparkling beverage to the above-mentioned specific range, and for example, the method may include preparing a raw material solution using a plant raw material to produce the sparkling beverage using the raw material solution. In this case, the raw material solution is prepared by mixing the plant raw material with water (preferably hot water). The obtained raw material solution contains a component extracted from the plant raw material.

The plant raw material is not particularly limited as long as the plant raw material can be used in a production of a beverage, and the plant raw material may contain, for example, one or more kinds selected from a group consisting of grains (for example, one or more kinds selected from a group consisting of barley, wheat, rice, and corn), beans, and potatoes. Those grains, beans, and potatoes may be germinated, or ungerminated.

Specifically, the plant raw material may be, for example, one or more kinds selected from a group consisting of malt, barley, and wheat. The malt may be, for example, barley malt and/or wheat malt. The barley malt is obtained by germinating barley. The wheat malt is obtained by germinating wheat. A use of the malt may be use of a malt extract. As the malt extract, a commercially available malt extract may be used.

In addition, the plant raw material may contain hops. In this case, the plant raw material may contain: one or more kinds selected from a group consisting of grains (for example, one or more kinds selected from a group consisting of barley, wheat, rice, and corn), beans, and potatoes; and hops. In addition, the plant raw material may contain: one or more kinds selected from a group consisting of malt, barley, and wheat; and hops.

When malt is used, the raw material solution may be prepared through saccharification. That is, in this case, the raw material solution is prepared by mixing the malt with water (preferably hot water) and subjecting the resultant mixed liquid to saccharification. The saccharification is performed by, for example, maintaining the mixed liquid containing malt and water at a temperature (for example, from 30° C. to 80° C.) at which a digestive enzyme (for example, an amylase or a protease) contained in the malt acts.

When malt and hops are used, the raw material solution may be prepared by, for example, mixing the malt with water (preferably hot water), and adding the hops to the resultant mixed liquid, followed by boiling. In addition, the raw material solution may be prepared by, for example, mixing the malt with water (preferably hot water), subjecting the mixture to saccharification, and then adding the hops, followed by boiling.

The method of producing a sparkling beverage according to this embodiment of the present invention may include: preparing a raw material solution using a plant raw material; and adding a yeast to the raw material solution to perform alcoholic fermentation. In this case, a sparkling alcoholic beverage may be produced, or a sparkling non-alcoholic beverage may be produced.

In a case where the alcoholic fermentation is performed and a sparkling non-alcoholic beverage is produced, for example, a fermentation liquid after the alcoholic fermentation may be subjected to alcohol removal treatment for reducing its ethanol content to produce the sparkling non-alcoholic beverage using the fermentation liquid after the alcohol removal treatment. In addition, the fermentation liquid after the alcoholic fermentation may be diluted to produce the sparkling non-alcoholic beverage.

The alcoholic fermentation is initiated by adding a yeast (for example, a beer yeast) to the raw material solution. Specifically, the alcoholic fermentation is performed by, for example, maintaining a fermentation liquid prepared by adding a yeast to the raw material solution at a predetermined temperature (for example, from 0° C. to 30° C.) for a predetermined time (for example, from 1 day to 14 days). The concentration of the yeast in the fermentation liquid at the beginning of the fermentation is not particularly limited, and may be, for example, from $1 \times 10^6$ cells/mL to $3 \times 10^9$ cells/mL.

In addition, maturation may be performed after the alcoholic fermentation. That is, in this case, the sparkling beverage is produced by performing alcoholic fermentation and further performing maturation. The maturation is performed by further maintaining the fermentation liquid after the alcoholic fermentation at a predetermined temperature for a predetermined time. During the maturation, insoluble substances in the fermentation liquid are precipitated to remove turbidity, and flavor is improved.

The method of producing a sparkling beverage according to the embodiment of the present invention may include, for example, preparing a raw material solution using a plant raw material to produce the sparkling beverage using the raw material solution without performing alcoholic fermentation. In this case, a sparkling non-alcoholic beverage may be produced, or a sparkling alcoholic beverage may be produced.

In a case where a sparkling alcoholic beverage is produced without alcoholic fermentation, for example, ethanol may be added. As a method of imparting foam properties to the beverage without performing alcoholic fermentation, for example, one or more kinds selected from a group consisting of carbonated water and carbon dioxide gas may be used.

In a case where the sparkling beverage is produced without alcoholic fermentation, the sparkling beverage may be produced by, for example, mixing the raw material solution with any other raw material. In this case, as the other raw material, for example, one or more kinds selected from the group consisting of saccharides, dietary fibers, acidulants, dyes, flavors, sweeteners, and bittering agents may be used.

A method of adjusting the nitrogen/extract ratio to the above-mentioned predetermined range is not particularly limited as long as the method involves adjusting the extract (w/v %) of the sparkling beverage and/or adjusting the nitrogen content of the sparkling beverage.

That is, when alcoholic fermentation is performed, the extract (w/v %) of the sparkling beverage may be adjusted on the basis of, for example, one or more selected from a group consisting of: a composition of the raw material solution (a composition of the raw material solution is adjusted on the basis of, for example, a composition of the raw material and/or conditions under which the raw material solution is prepared (preparation conditions)); conditions for the alcoholic fermentation (for example, one or more selected from a group consisting of a temperature of alcoholic fermentation, number of days of alcoholic fermentation, an amount of yeast, and aeration); and dilution.

In addition, when alcoholic fermentation is not performed, the extract (w/v %) of the sparkling beverage may be adjusted on the basis of, for example, one or more selected from a group consisting of: a composition of the raw material solution (a composition of the raw material solution is adjusted on the basis of, for example, a composition of the raw material and/or conditions under which the raw material solution is prepared (preparation conditions)); and a composition of the other raw material to be mixed with the raw material solution.

In addition, the nitrogen content (ppm) of the sparkling beverage may be adjusted on the basis of one or more selected from a group consisting of: contact between the sparkling beverage and nitrogen gas (for example, filling of gas which contains nitrogen into an empty portion inside a container in which the sparkling beverage is held); addition of liquid nitrogen to the sparkling beverage (for example, addition of liquid nitrogen into a container in which the sparkling beverage is held); and blowing of nitrogen gas into the sparkling beverage.

Next, specific examples according to the embodiment are described.

EXAMPLES

[Production of Sparkling Beverage]

First, a raw material solution was prepared using plant raw materials. As the plant raw materials, malt and hops were used. As the malt, barley malt was used. That is, a raw material solution was prepared using raw materials containing malt, hops, and water. In Example 1, the ratio of the malt in the raw materials excluding the hops and the water was 67 wt % or more. In Example 2, the ratio of the malt in the raw materials excluding the hops and the water was less than 25 wt %.

Specifically, a mixed liquid obtained by mixing the raw materials except the hops was maintained at 65° C. to be subjected to saccharification. Further, the hops were added to the mixed liquid after the saccharification, followed by boiling. The mixed liquid after the boiling was cooled to provide the raw material solution.

Subsequently, 0.5 wt % of a beer yeast was added to the raw material solution to perform alcoholic fermentation. After the alcoholic fermentation, maturation was further performed. Then, the fermentation liquid after the maturation was filtered to provide a sparkling beverage. The sparkling beverage was a sparkling alcoholic beverage having an ethanol content of from 5 vol % to 6 vol % and a color value of from 5 EBC to 8 EBC.

In each of Example 1 and Example 2, six kinds of sparkling beverages different from each other in extract (w/v %) and nitrogen content (ppm) were produced. The extract was mainly adjusted by the composition of the raw materials and conditions under which the raw material solution was prepared (preparation conditions).

Further, an aluminum can having a volume of 371 mL was filled with 350 mL of each of the sparkling beverages, liquid nitrogen was added dropwise to the empty portion inside the can, and finally, the can was sealed. Thus, a sparkling beverage product which includes the sparkling beverage and the can holding the sparkling beverage was produced.

[Extract]

The extract of each of the sparkling beverages was measured. That is, a pull-tab of the can of the sparkling beverage product was opened to form an opening, and the sparkling beverage was poured from the opening into a predetermined container. Then, the extract (real extract) (w/v %) of the sparkling beverage was measured in accordance with a method disclosed in the literature: "Revised BCOJ Beer Analysis Method, Enlarged and Revised Edition 2013, edited by Brewery Convention of Japan (Analysis Committee), Brewers Association of Japan", "8.4.3 Alcolyzer Method".

[Nitrogen Content]

The nitrogen content of each of the sparkling beverages was measured. A commercially available dissolved nitrogen/carbon dioxide gas analyzer (model 511 series, manufactured by HackUltra Co., Ltd.) was used. The analyzer was equipped with a detector for nitrogen gas and a detector for carbon dioxide gas each including a thermal conductivity detector (TCD) element.

Specifically, the nitrogen content and the carbon dioxide gas pressure of the sparkling beverage inside the can of the sparkling beverage product were measured at 20° C. by inserting, into the sparkling beverage, a needle-like sampling part connected to the detector for carbon dioxide gas and the detector for nitrogen gas in the analyzer. The measurement with the detector for carbon dioxide gas was performed in a range of from 0 bar to 10 bar, and the measurement with the detector for nitrogen gas was performed in a range of from 0 ppm to 350 ppm.

[Foam Properties]

The NIBEM value of each of the sparkling beverages was measured. That is, the NIBEM value of the sparkling beverage held in the container of the sparkling beverage product was measured in accordance with a method disclosed in the literature: "Revised BCOJ Beer Analysis Method, Enlarged and Revised Edition 2013 (edited by Brewery Convention of Japan (Analysis Committee), Brewers Association of Japan, publishing office: The Brewing Society of Japan)", "8.29 Foam—Foam-stability Measurement Method using NIBEM-T-". Specifically, first, from the can of the sparkling beverage product, foam of the sparkling beverage was extracted into a standard glass using a foam extractor. Subsequently, through the use of a commercially available measurement apparatus (NIBEM-TPH, manufactured by Haffmans), a time required for reducing the height of formed foam by 30 mm from a measurement starting position was evaluated as the NIBEM value (seconds).

In addition, the foam adherence of each of the sparkling beverages was measured. That is, the glass surface having foam adhering thereto after measuring the NIBEM value as described above was optically scanned using a commercially available measurement apparatus (Nibem Cling Meter, manufactured by Haffmans), and the ratio of the area of a part covered with foam with respect to the total area scanned was evaluated as the foam adherence (%).

[Sensory Test]

A sensory test was performed by four experienced panelists. That is, each of the panelists performed a five-grade evaluation for each of the sparkling beverages by giving a score of 1, 2, 3, 4, or 5. Then, for each of the sparkling beverages, the arithmetic average of the scores given was calculated. A larger score given means that the flavor was evaluated to be more excellent.

[Results]

Figure 1B:
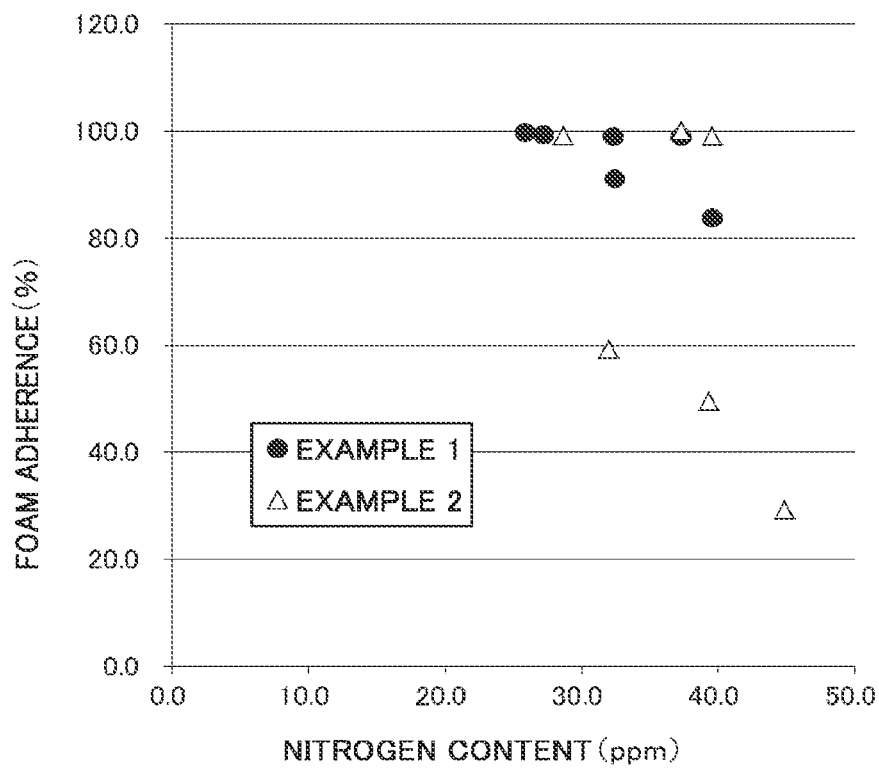
FIG. 1B is an explanatory diagram for showing examples of evaluation results for a relationship between a nitrogen content (ppm) of the sparkling beverage and foam adherence of the sparkling beverage in Examples according to one embodiment of the present invention.
Figure 2:
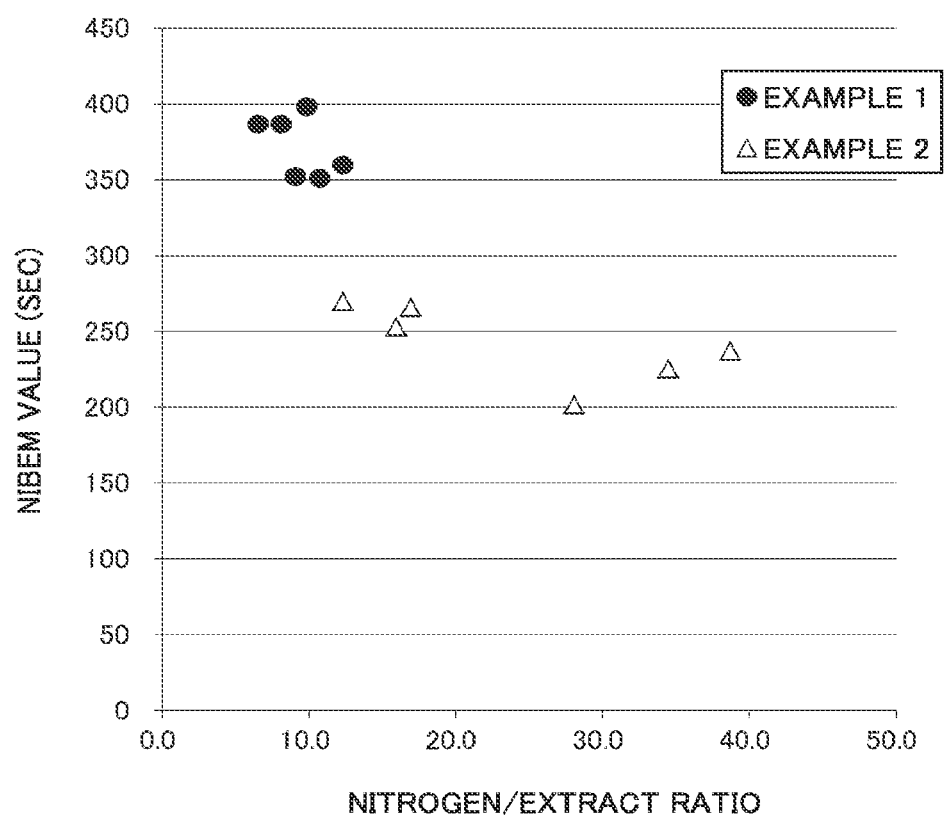
FIG. 2 is an explanatory diagram for showing examples of evaluation results for a relationship between a ratio of a nitrogen content (ppm) to an extract (w/v %) of the sparkling beverage and a NIBEM value of the sparkling beverage in Examples according to one embodiment of the present invention.
Figure 3:
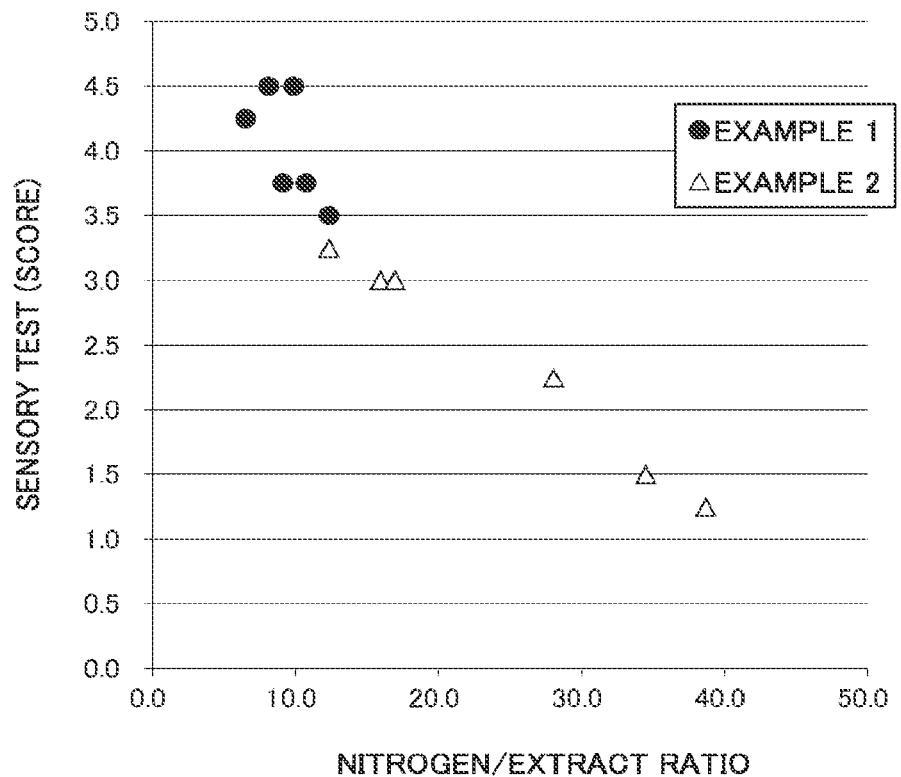
FIG. 3 is an explanatory diagram for showing examples of evaluation results for a relationship between a ratio of a nitrogen content (ppm) to a extract (w/v %) of the sparkling beverage and a score given to the sparkling beverage in a sensory test in Examples according to one embodiment of the present invention.

In FIG. 1A and FIG. 1B, the evaluation results of the foam adherence are shown. In FIG. 1A, the horizontal axis represents the nitrogen/extract ratio, and the vertical axis represents the foam adherence (%). In FIG. 1B, the horizontal axis represents the nitrogen content (ppm), and the vertical axis represents the foam adherence (%). In FIG. 2, the evaluation results of the NIBEM value are shown. In FIG. 2, the horizontal axis represents the nitrogen/extract ratio, and the vertical axis represents the NIBEM value (seconds). In FIG. 3, the results of the sensory test are shown. In FIG. 3, the horizontal axis represents the nitrogen/extract ratio, and the vertical axis represents the score (arithmetic average). In those figures, filled circles represent the results of Example 1, and outlined triangles represent the results of Example 2.

As shown in FIG. 1A, while the foam adhering ratio was 59.2% or less (from 29.2% to 59.2%) when the nitrogen/extract ratio was 28.0 or more (the extract was 1.14 w/v %), the foam adhering ratio was remarkably high when the nitrogen/extract ratio was less than 28.0. Specifically, when the nitrogen/extract ratio was 16.9 or less (the extract was from 2.34 w/v % to 4.01 w/v %), the foam adhering ratio was 83.8% or more (from 83.8% to 100.0%).

Meanwhile, as shown in FIG. 1B, when attention was focused on only the nitrogen content, no clear tendency was found between the nitrogen content and the foam adherence. That is, as shown in FIG. 1A and FIG. 1B, surprisingly, foam properties were effectively improved by adjusting the nitrogen/extract ratio to the specific range. The nitrogen contents of the twelve kinds of sparkling beverages were from 25.9 ppm to 44.9 ppm.

Similarly, as shown in FIG. 2, while the NIBEM value was 237 seconds or less (from 202 seconds to 237 seconds) when the nitrogen/extract ratio was 28.0 or more, the NIBEM value was remarkably large when the nitrogen/extract ratio was less than 28.0. Specifically, when the nitrogen/extract ratio was 16.9 or less, the NIBEM value was 253 seconds or more (from 253 seconds to 398 seconds).

In addition, in this case, while the NIBEM value was 270 seconds or less when the extract was 2.33 w/v % or less, a larger NIBEM value was obtained when the extract was larger. That is, when the extract was 2.99 w/v % or more, the NIBEM value was 351 seconds or more.

Furthermore, similarly, as shown in FIG. 3, while the score given in the sensory test was 2.3 or less (from 1.3 to 2.3) when the nitrogen/extract ratio was 28.0 or more, the score was remarkably large when the nitrogen/extract ratio was less than 28.0. Specifically, when the nitrogen/extract ratio was 16.9 or less, the score given in the sensory test was 3.0 or more (from 3.0 to 4.5).

Moreover, in this case, while the score was 3.3 or less when the extract was 2.33 w/v % or less, a larger score was obtained when the extract was larger. That is, when the extract was 2.99 w/v % or more, the score given in the sensory test was 3.5 or more. The panelists made a comment that as the extract of the sparkling beverage increased, its mildness improved.

The invention claimed is:

1. A sparkling beverage held in a container, the sparking beverage prepared from raw materials comprising malt, hops and water, and having a ratio of less than 28.0,
   wherein the ratio is obtained by dividing a nitrogen content (ppm) by an extract (w/v %) of the sparkling beverage,
   wherein the nitrogen content is obtained by measuring a nitrogen gas pressure in an empty portion inside the container at 20° C., and
   wherein the extract is 2.99 w/v or more.

2. The sparkling beverage according to claim 1, wherein the nitrogen content is 20 ppm or more.

3. The sparkling beverage according to claim 1, wherein the sparkling beverage has a NIBEM value of 351 seconds or more.

4. The sparkling beverage according to claim 1, wherein the sparkling beverage is held in the container having a volume of 1 L or less.

5. The sparkling beverage according to claim 1, wherein the nitrogen content is 25.9 ppm or more.

6. The sparkling beverage according to claim 1, wherein the nitrogen content is 44.9 ppm or less.

7. The sparkling beverage according to claim 1, wherein the extract is 10.0 w/v % or less.

8. The sparkling beverage according to claim 1, wherein the ratio is 3.0 or more and less than 20.0.

9. The sparkling beverage according to claim 1, wherein
   the sparkling beverage is produced using a raw material solution prepared from raw materials including malt, hops and water, and
   a malt ratio in the raw materials excluding hops and water is 67 wt % or more.

10. A method of producing a sparkling beverage held in a container, the method comprising preparing a raw material solution using raw materials including malt, hops and water, and producing the sparkling beverage using the raw material solution,
    wherein the method further comprising adjusting a ratio of less than 20.0, wherein the ratio is obtained by dividing a nitrogen content (ppm) by an extract (w/v %) of the sparkling beverage,
    wherein the nitrogen content is obtained by measuring a nitrogen gas pressure in an empty portion inside the container at 20° C.,
    wherein a ratio of the malt in the raw materials excluding the hops and the water is 67 wt % or more, and
    wherein the extract of the sparkling beverage is 2.99 w/v % or more.

11. A method of improving foam properties of a sparkling beverage held in a container, comprising adjusting a ratio of less than 20.0, wherein the ratio is obtained by dividing a nitrogen content (ppm) by an extract (w/v %) of the sparkling beverage, to thereby improve foam properties of the sparkling beverage,
    wherein the nitrogen content is obtained by measuring a nitrogen gas pressure in an empty portion inside the container at 20° C.,
    wherein the sparkling beverage is produced using a raw material solution prepared using raw materials including malt, hops and water,
    wherein a ratio of the malt in the raw materials excluding the hops and the water is 67 wt % or more, and
    wherein the extract of the sparkling beverage is 2.99 w/v % or more.

* * * * *